US011455381B2

(12) United States Patent
Cabrera

(10) Patent No.: US 11,455,381 B2
(45) Date of Patent: Sep. 27, 2022

(54) SYSTEMS AND METHODS FOR PROVIDING MULTIPLE FUNCTIONALITIES ASSOCIATED WITH A QR CODE

(71) Applicant: Cielo Enterprise Solutions Inc., Miami, FL (US)

(72) Inventor: Ricardo Cabrera, Miami Dade, FL (US)

(73) Assignee: CIELO Enterprise Solutions, Inc., Miami, FL (US)

( * ) Notice: Subject to any disclaimer, the term of this patent is extended or adjusted under 35 U.S.C. 154(b) by 351 days.

(21) Appl. No.: 16/854,156

(22) Filed: Apr. 21, 2020

(65) Prior Publication Data

US 2021/0326417 A1    Oct. 21, 2021

(51) Int. Cl.
*G06F 21/31*    (2013.01)
*G06K 7/14*    (2006.01)

(52) U.S. Cl.
CPC ........... *G06F 21/31* (2013.01); *G06K 7/1417* (2013.01)

(58) Field of Classification Search
CPC .............................. G06F 21/31; G06K 7/1417
See application file for complete search history.

(56) References Cited

U.S. PATENT DOCUMENTS

| 9,619,770 | B2 | 4/2017 | Bisroev |
| 10,287,345 | B2 | 5/2019 | Donovan |
| 2014/0027503 | A1* | 1/2014 | Kennedy ................. G06F 16/58 235/375 |

FOREIGN PATENT DOCUMENTS

| GB | 2531732 | 5/2016 |
| JP | 6537777 | 7/2019 |
| KR | 1015808670000 | 1/2016 |
| KR | 102013395 | 8/2019 |

* cited by examiner

*Primary Examiner* — Matthew Mikels

(57) ABSTRACT

In one embodiment, a method includes receiving a request from a client computing device to access an electronic GUI associated with a particular QR code scanned by the client computing device. The particular QR code is associated with at least a default GUI and a secure GUI corresponding to the particular QR code. The method includes determining whether a user associated with the requesting client computing device is authenticated to access the secure GUI corresponding to the particular QR code. When that user is authenticated to access the secure GUI, then the method includes selecting the secure GUI for presentation by the requesting client computing device. When the user associated with the requesting client computing device is not authenticated to access the secure GUI corresponding to the particular QR code, then the method includes selecting the default GUI for presentation by the requesting client computing device.

27 Claims, 3 Drawing Sheets

SYSTEMS AND METHODS FOR PROVIDING MULTIPLE FUNCTIONALITIES ASSOCIATED WITH A QR CODE

TECHNICAL FIELD

This disclosure generally relates to QR codes and providing functionality associated with such codes.

BACKGROUND

A Quick Response (QR) code is a machine-readable optical label that encodes information. A QR reader decodes the information encoded by a QR code. For example, a handheld device such as a smartphone may be equipped with a QR code reader and an optical camera. The optical camera may capture an image of the QR code, and the QR code reader may decode the image of the QR code to identify the encoded information. For example, such information may include information describing a product identifier or a location. As another example, a QR code may identify a uniform-resource locater (URL), i.e., a website address. Continuing the example of a smartphone above, the QR code reader may decode the image of the QR code to identify the URL. A web browser on the mobile device may automatically access the URL and automatically display the corresponding content on a display of the mobile device.

DESCRIPTION OF EXAMPLE EMBODIMENTS

Figure 1:
FIG. 1 illustrates an example QR code.

FIG. 1 illustrates an example QR code 100. As shown in the example of FIG. 1, QR code 100 is associated with a specific zone, i.e., Zone 1100. As shown in the example of FIG. 1, QR code 100 is also associated with some textual content for communicating a specific message to a user. For example, the QR code of FIG. 1 is associated with text that may be presented to a customer at a business's premises, such as a hotel lobby, at which the QR code is placed. The text associated with QR code 100 may identity for the consumer what consumer-facing functionality to expect from QR code 100 For example, upon scanning QR code 100 with a client device having a QR scanner, a consumer may be presented with a page for providing customer feedback or input regarding the area associated with Zone 1100.

In particular embodiments, upon scanning QR code 100 with a client device having a QR scanner, a user may be prompted with questions about specific topics associated with zone 1100, such as a specific attribute (e.g., cleanliness) of a specific area (e.g., the bathroom) associated with Zone 1100. In particular embodiments, a consumer may be presented with free-form input capabilities (e.g., a text box), with constrained input options (e.g., a rating from 1-10), or both. As explained more fully herein, user-facing information may be presented in any suitable format. While in the examples discussed above the user would often be a customer of a business (e.g., hotel) who is at the business's premises, in other embodiments a user or customer may have a different relationship with the place at which a QR code is located. For example, a QR code may be used to track inventory and/or shipments. A QR code may be placed in a warehouse and scanned by a delivery person, at which point the delivery person may be presented with a list of packages for loading and delivery, while on the other hand a warehouse employee may be presented with forms including a list of existing inventory at the warehouse. As illustrated in this example, the user for whom a default form is presented may be a vendor or even an employee, and in particular embodiments the text associated with a QR code may be targeted to a graphical user interface associated with the default functionality. Moreover, this disclosure contemplates that QR codes may be used with or without accompanying textual descriptions, as appropriate.

In particular embodiments, a QR code may be activated for use. For example, the entity (such as a business) deploying the QR code may assign a zone to the QR code. In particular embodiments, a zone indicates a particular region of physical space with which the QR code and, in particular embodiments, information provided upon scanning the QR code is associated. For example, a zone may be a hotel room, a lobby, a bathroom, an entire business (such as a restaurant), a park, a parking lot, a warehouse, or another suitable region. In particular embodiments, a zone may be a piece of equipment, such as a particular movie projector in a theater or a particular piece of medical equipment. Thus, this disclosure contemplate that a zone may identify a fixed location (such as a building) or physical item that does not necessarily have a fixed location.

In particular embodiments, the zone associated with a particular QR code along with related information (such as a custom name for the zone) can be configured by, e.g., the provider of the QR code as many times as desired. In particular embodiments, more than one QR code may be associated with the same zone. For example, two QR codes placed within the same bathroom may each be associated with that bathroom. In particular embodiments, a QR code may be associated with multiple zones, while other QR codes may be associated with a single zone. For example, a QR code in a particular hotel room may be associated with that hotel room, while a QR code near the entrance to the hotel may be associated with the entire hotel, which includes the particular hotel room.

As explained more fully herein, when a user scans a QR code the resulting functionality may also be tailored to the particular zone with which the scanned QR code is particularly associated. As one example, particular webpages or other data may be associated with particular zones, and therefore with particular QR codes. For example, a QR code in a hotel room may be associated with that particular hotel room. As explained more fully below, when a user scans that particular QR code, the user may be presented with information particularly tailored to that zone, i.e., particularly tailored to that QR code. Such information may be a landing page to provide feedback on the room, or a landing page to view tasks associated with servicing that particular room. As with the relationship between a zone and a QR code, the information associated with a particular QR code or zone can be configured by an entity, such as a business in which the QR code is placed.

Once activated and placed in a particular location, a QR code may be scanned. This disclosure contemplates any suitable device and method for scanning and decoding a QR code. For example, a QR code may be scanned by mobile device, such as a smartphone, with an integrated camera and QR code scanner. The camera may capture an image of the QR code, which is then decoded by the QR code scanner to determine the information encoded by the QR code. For example, the information encoded by the QR code may be the address, such as the URL, of a network resource, such as a webpage. While the example above discusses scanning QR codes with a smartphone, this disclosure contemplates that any suitable device may be used, such as a smartwatch, a tablet, a laptop, or any other suitable device.

Figure 2:
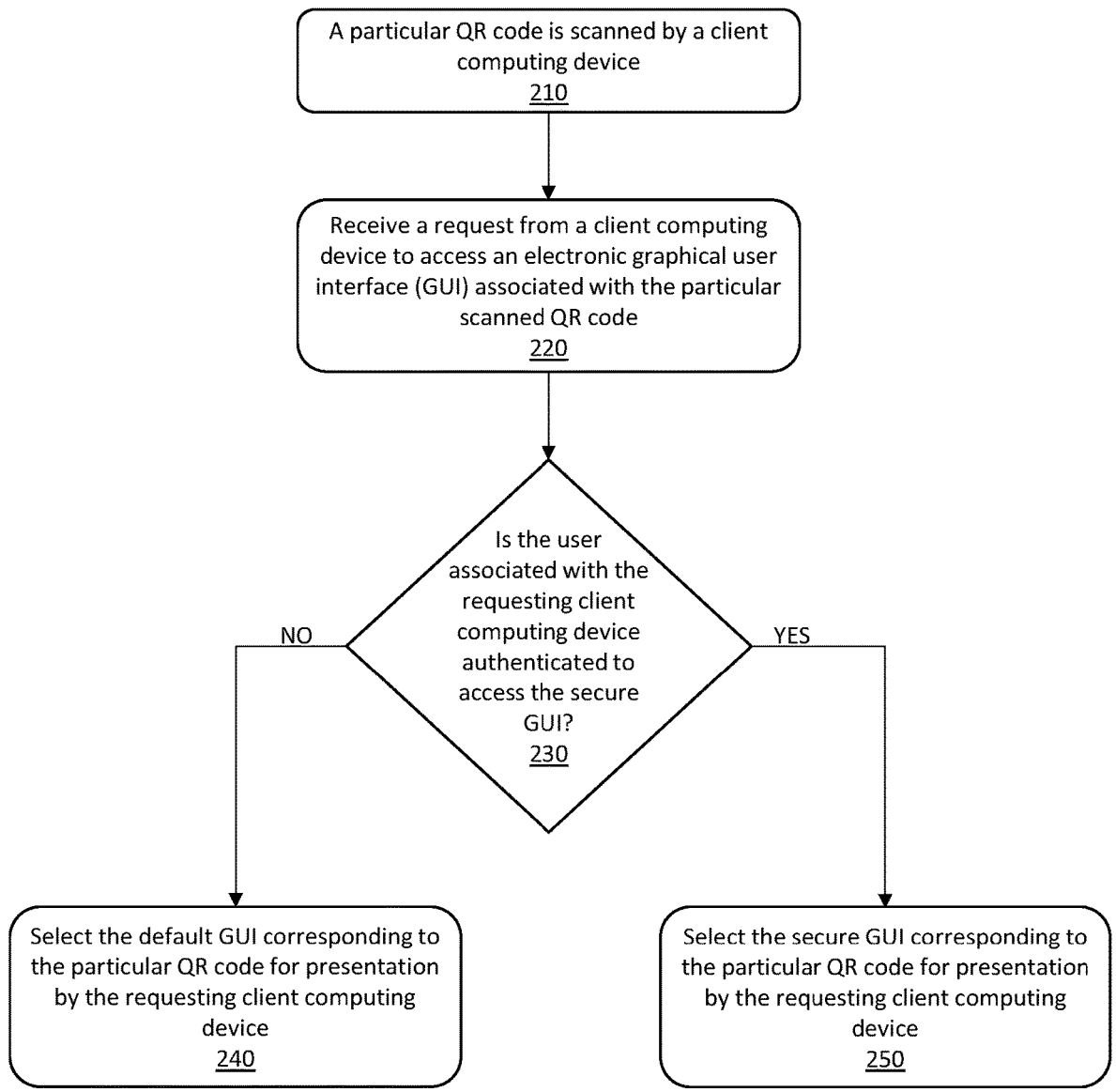
FIG. 2 illustrates an example method for determining which of multiple functionalities to provide to a user when a particular QR code is scanned.

As explained above, a particular QR code may be associated with multiple different functionalities. For example, a particular QR code may be associated with different webpages that may be presented when the QR code is scanned depending, for example, on the identity of the user scanning the QR code. FIG. 2 illustrates an example method for determining which of multiple functionalities to provide to a user when a particular QR code is scanned. The method of FIG. 2 may begin at step 210, in which a particular QR code that has been activated is scanned by a client computing device. As explained above, this disclosure contemplates any suitable device scanning a particular QR code.

The example method of FIG. 2 includes step 220, in which a request is received from the client computing device to access an electronic graphical user interface (GUI) associated with the particular QR code being scanned. In particular embodiments, a server or servers of a network may receive the request from the client device. This disclosure contemplates any suitable computer device acting as a server to the client computing device. This disclosure also contemplates any suitable networking connection or arrangement between the client computing device scanning the QR code and a server computing device that receives a request from the client computing device. For example, a network connection may include wireless and wired connections between client and server device, including wireless and wired connections between intermediary devices (e.g., cell towers) handling communications between the server and client computing devices. As another example, the server and client may be part of a public network, such as the Internet, or a private network, such as a private wireless network established by an entity associated with the QR code. This disclosure contemplates that receiving a request from a client computing device may comprise accessing such a request that has been received.

A request from a client device to access a GUI associated with a particular QR code may take any suitable form. For example, as described above, a QR code may encode a URL of a website. A QR code scanner in, e.g., a mobile device may decode the QR code and submit a request to access the content associated with the URL, for example by using a web browser integrated into the mobile device. This disclosure contemplates that a request to access a GUI may comprise a request to authenticate credentials necessary to access the GUI, as explained more fully below.

As explained above, a QR code may be associated with a particular zone. In addition, the QR code may be associated with multiple functionalities, which, in particular embodiments, may also each associated with the particular zone. For example, a QR code may be associated with at least a default GUI and a different, secure GUI. For example, the default GUI may present customer-facing material, such as a feedback form, to a user who has scanned the QR code. The default GUI may be associated with the particular QR code being scanned. For example, the QR code may identify a particular room in a hotel, and the default GUI may be a feedback form tailored to that particular room. The default GUI can take any suitable form. For example, the default GUI may include one or more interactive elements, such as radio buttons or a box for free-form text, permitting the user to provide feedback. As another example, an interactive region may include links to other content, such as contact information for the business associated with a particular QR code. A secure GUI may also be associated with a particular QR code. As used herein, a secure GUI refers to a GUI that can be accessed using some authentication credentials. This disclosure contemplates any suitable method for providing and validating such credentials.

Step 230 of the example of FIG. 2 includes determining whether the user associated with the requesting client computing device is authenticated to access the secure GUI. This determination may be made by any suitable computer device, such as, for example, a server computing device. As explained above, such a determination may be based on any suitable authentication method or credentials. For example, authentication credentials may include a PIN code for accessing secure functionality associated with a particular QR code. Given that a particular QR code and secure functionality may be associated with a particular zone, in particular embodiments authentication credentials may likewise be associate with a particular zone. For example, a PIN code may be associated with a particular zone such that the PIN code may authenticate a user to information associated with that zone, including to secure information associated with multiple QR codes within that zone. In particular embodiments, authentication credentials may be associated with a particular QR code, for example such that a PIN code may be associated and authenticate only to secure functionality associated with that particular QR code.

In particular embodiments, authentication credentials may be associated with a particular user or a particular role. For example, a PIN code may be associated with a particular user, e.g., may be assigned to or created by that particular user. The PIN code therefore identifies that particular user. The PIN code of that particular user may be associated with particular zones and/or particular QR codes. For example, a janitor may have a specific PIN code associated with QR codes in areas that the janitor is responsible for, and that janitor's authentication credentials (e.g., PIN code in this example) may authenticate to each of the QR codes in the zone(s) corresponding to the areas that the janitor is responsible for. As another example, each title or role within an organization may share authentication, such as a PIN. For example, janitors may have one PIN, housekeepers another PIN, and hospitality staff yet another PIN. As explained more fully herein, each of these PINs may be associated with different functionality, such as different information presented on a secure GUI.

In particular embodiments, authentication credentials to access a functionality of a multi-functionality QR code may be associated with a particular place or entity. For example, an entity such as a small business may have a single PIN associated with that entity, which may authenticate a user presenting the PIN to access a secure GUI associated with any QR code used by that entity even if, for example, such QR codes (and, in particular embodiments, secure GUIs) may be associated with different zones. As another example, a PIN code may be associated with a particular instance of a chain restaurant, such that the PIN code authenticates a user to secure GUIs associated with any QR code at that restaurant. A different PIN code may be used for different instances of that chain restaurants. As explained herein, functionality (such as a secure GUI) associated with a particular QR code may be different than functionality (such as a secure GUI) associated with a different particular QR code, even if the authentication credentials to access those secure GUIs through the particular QR codes are the same.

In particular embodiments, authentication credentials may be associated with an entity that is separate from, but related to, the entity at which the QR codes are placed. For example, a company may maintain and provide technical service for equipment, such as medical equipment. In this example, technicians at the company may inspect or maintain equipment at several hospitals but are not employees of any particular hospital. Each hospital may include QR codes that identify, for example, a default GUI that identifies a service history or operational status of a particular medical device or of medical devices in, for example, the zone associated with the particular QR code. The QR code may also be associated with a secure GUI that, for example, identifies maintenance or service requirements and tasks. Technicians of the company that provides technical service for medical equipment may provide authentication credentials (such as PINs) to technicians. These credentials may access the secure GUIs of multiple QR codes that are themselves associated with different hospitals. In addition, each of these hospitals may provide, e.g., doctors or staff with separate authentication credentials (such as PIN codes) that authenticate to secure functionality associated with specific QR codes at the hospital (or at a portion of the hospital) at which those doctors or staff work. As this example illustrates, a QR code may be associate with one type of secure functionality (such as a specific secure GUI) that is accessed by one specific authentication credential or one set of authentication credentials, while that same QR code is also associated with another type of secure functionality that is accessible by a specific authentication credential or one set of authentication credentials. A particular authentication credential may access more than one type of secure functionality. For example, a doctor's authentication credentials may access a specific, secure form showing the status of a particular medical device associated with a particular QR code, and/or a list of patients who have used or are scheduled to use that particular device. The doctor's authentication credentials may not access that particular secure GUI associated with medical devices at other hospitals. In contrast, a technician's credentials may access a secure GUI showing the status of a particular device, as well as service-specific information (such as tasks and results) for that particular device, the latter of which the doctor's authentication credentials cannot access. The technicians' credentials may also access that information for devices associated with QR codes at several different hospitals. However, the technician's credential may not access patient-related information, which the doctor's credentials do access.

As the example above illustrates, different credentials may access the same, different, or overlapping functionality associated with a specific QR code. As a QR code may be associated with a specific zone, this permits QR codes to provide zone-specific access to multiple functionalities associated with particular QR codes. In addition, this reduces physical handling of devices from multiple individuals. For example, while GUIs may be accessed from, e.g., a central computer or touchscreen, sharing such a device may lead to security issues as well as health-related issues, such as increased transmission of communicable diseases. In addition, associating multiple functionalities with a particular QR code reduces the cost required for providing a device that can access that functionality, as instead a user uses his or her own device to access that functionality. Moreover, users may be able to access information using their device (i.e., by leveraging the QR code technology), reducing the learning costs associated with leaning to use a different device or system.

This disclosure contemplates that the examples above of specific types of authentication, such as user-specific and entity-specific authentication, may be used in isolation or in any suitable combination. For example, a particular QR code may be located in the lobby of a particular restaurant. A default GUI may be provided that asks a user for feedback regarding aspects of the restaurant, such as cleanliness, food quality, and customer service. Associated with this QR code may be different secure GUIs, which may be accessed via different authentication credentials. For example, employees of the restaurant may have user-specific PIN codes that access certain secure GUIs. For example, a greeter at the restaurant may have a user-specific PIN code that accesses tasks or feedback regarding cleanliness and food quality. A manager at the restaurant may have a user-specific PIN code that accesses that same information as well as information regarding feedback identifying specific employee's customer service at the restaurant. A vendor of the restaurant providing cleaning services for the restaurant may have a vendor-specific PIN code that accesses tasks regarding the cleanliness of the restaurant, but not tasks or feedback regarding food quality or specific employee's customer service. In addition, the PIN codes of the restaurant employees may be associated with the particular QR codes at that restaurant, while the vendor-specific PIN codes my also access secure information regarding cleaning tasks associated with QR codes a different restaurant at which the vendor provides custodian services. As this example illustrates, aspects of the disclosure herein provide for multi-level functionality of a customer-facing QR code that is accessible from user's own devices.

This disclosure contemplates that provision and evaluation of authentication credentials to access a secure functionality associated with a QR code, such as a secure GUI, may occur at any suitable point in an authentication process. For example, in particular embodiments, when a user scans a QR code the user may be presented with a default GUI associated with the QR code on the device used to scan the code. As explained herein, the default GUI may be, e.g., a form for receiving feedback from a user regarding the entity or at least part of the zone with which the QR code is associated. The default GUI may include an interactive element, such as a link or textual input area, for receiving authentication credentials (such as a PIN). When the user supplies valid authentication credentials, the user may be granted access to secure functionality associated with that particular QR code, such as the secure GUI describe herein. Thus, for example, after step 220 and prior to step 230 of the example method of FIG. 2, a user may be presented with the default GUI. Decision step 230 may occur in response to receiving the user's credentials, upon which the user is either determined to provide valid credentials and is permitted to access a secure functionality of the GUI, or the user supplies invalid credentials and the default GUI is again displayed, optionally after or in addition to a message explaining that invalid credentials were received.

As another example, a user's authentication credentials may be associated with the particular device used to scan the QR code, or with a particular application on that device that the user is logged into. For example, upon scanning a QR code, the user's device may automatically transmit authentication credentials to, e.g., a server computing device, which may evaluate the credentials (such as in step 230 of the example method of FIG. 2) and determine which functionality (such as a particular GUI) to display. As one example, upon scanning a QR code, the user may first be directed to a URL that evaluates whether the user has valid authentication credential (e.g., as in step 230 of the example method of FIG. 2). The user's device may automatically supply credentials in response to being directed to the URL. If the user's device presents valid credentials associated with the particular QR code, then the user may be permitted to access a secure functionality associated with that QR code. On the other hand, if the user's device does not provide any valid credentials for that particular QR code, then the user may be presented with the default GUI. Thus, for example, a request for or receipt of authentication credentials may occur with or after step 220 of the example method of FIG. 2, and step 230 may occur before any particular electronic GUI associated with a QR code is presented to a user. This disclosure also contemplates that a user's credentials may be automatically supplied and evaluated before any particular GUI is presented to the user, and in addition the default GUI may contain an interactive element for automatically or manually supplying any credentials, if the user wishes to access a secure functionality.

After step 230, the example method of FIG. 2 moves to steps 240 or 250. At step 240, if the user's credentials are determined not to be valid for the particular QR code scanned in order to access secure functionality associated with that QR code, then a default GUI is selected to provide to the user's client computing device for display.

In the alternative, at step 250 if the user credentials are determined to be valid for the particular QR code scanned in order to access secure functionality associated with that QR code, then a secure GUI is selected to provide to the user's client computing device for display. As explained above, multiple different secure GUIs and authentication credentials or authentication levels may be associated with a particular QR code. In particular embodiments, a secure GUI may provide an interactive form, such as a checklist of a set of tasks associated with the zone corresponding to the particular QR code scanned. The interactive form may include interactive elements, such as checkboxes, a place for digital signatures, a place for free-from text entry, etc. In particular embodiments, contextual information such as the time at which a secure form was modified by a user scanning the QR code may be stored along with the modification. In particular embodiments, when a user accesses a secure GUI using user-specific credentials that identify the user, then the user's identity may also be stored with that user's modifications to the form. For example, when an employee provides a user-specific PIN code that identifies that employee, then tasks noted as completed by that employee (such as cleaning tasks or maintenance performed) may be associated with the user's identity (e.g., the user's name may be automatically filled into the form, reducing the amount of manual entry required.)

As explained above, different authentication credentials may be associated with different secure functionality associated with a particular QR code. For example, the user's credentials may determine not only whether the user may access secure information associated with the QR code, but the user's credentials may also determine exactly what functionality is provided, such as what content is displayed on a secure form. For example, as explained above, a technician may be provided with a set of tasks related to maintenance associated with a zone corresponding to a particular QR code, while a manager may be provided with a different set of tasks or with a summary of completed and outstanding tasks for all employees associated with tasks in that zone.

As explained above, a QR code may be associated with one or more zones, and the default GUI and secure GUI may also be associated with one or more zones. In particular embodiments, one or more of the default GUI, secure GUI, and QR codes may be associated with different zones. For example, a QR code may be associated with a specific room in a hotel, while a secure GUI associated with that QR code may also be associated with other rooms in the hotel (e.g., by showing a checklist associated with those other rooms). Likewise, a default GUI may be associated with common areas such as bathrooms, while a particular QR code and an associated secure GUI in a particular bathroom may be associated with that specific bathroom (e.g., the secure GUI may present a checklist of tasks specifically related to that bathroom). This disclosure contemplates that while particular QR codes may be associated with particular default and secure GUIs and also with particular zones, default and secure GUIs may also be associated with particular zones, which need not be exactly the same zones.

In particular embodiments, aspects of a secure GUI and default GUI associated with a particular QR code may have some overlap. For example, an employee may be presented with a list of tasks associated with the zone in corresponding to the QR code, and may be able to edit and update the status of those tasks. Similarly, a customer scanning the same QR code may see a default GUI that displays a list of completed tasks or a summary of the list of completed tasks. Thus, the business can automatically inform customers about the steps the business has taken and also manage employee workflows, all from the same QR code.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

While specific examples of the use of multi-functionality QR codes is described above, this disclosure contemplates any suitable use. For example, such QR codes may be used to provide inventory management. A delivery person, upon scanning a QR code at a particular loading station, may be presented with a list of packages for delivery on a particular truck, while a warehouse worker may be presented with a list of that's days shipments from that particular loading dock. As another example, such QR codes may be used to identify maintenance tasks, device or item history, and tasks associated with a particular zone.

As explained above, aspects of the systems and methods described herein use one or more computer systems, such as client computing devices. The architecture of a computer system is well-know and is described, for example, in paragraphs 35-44 and FIG. 3 of U.S. Patent Application Publication No. 2015/0062178, portions of which are reproduced below and are incorporated by reference herein.

Figure 3:
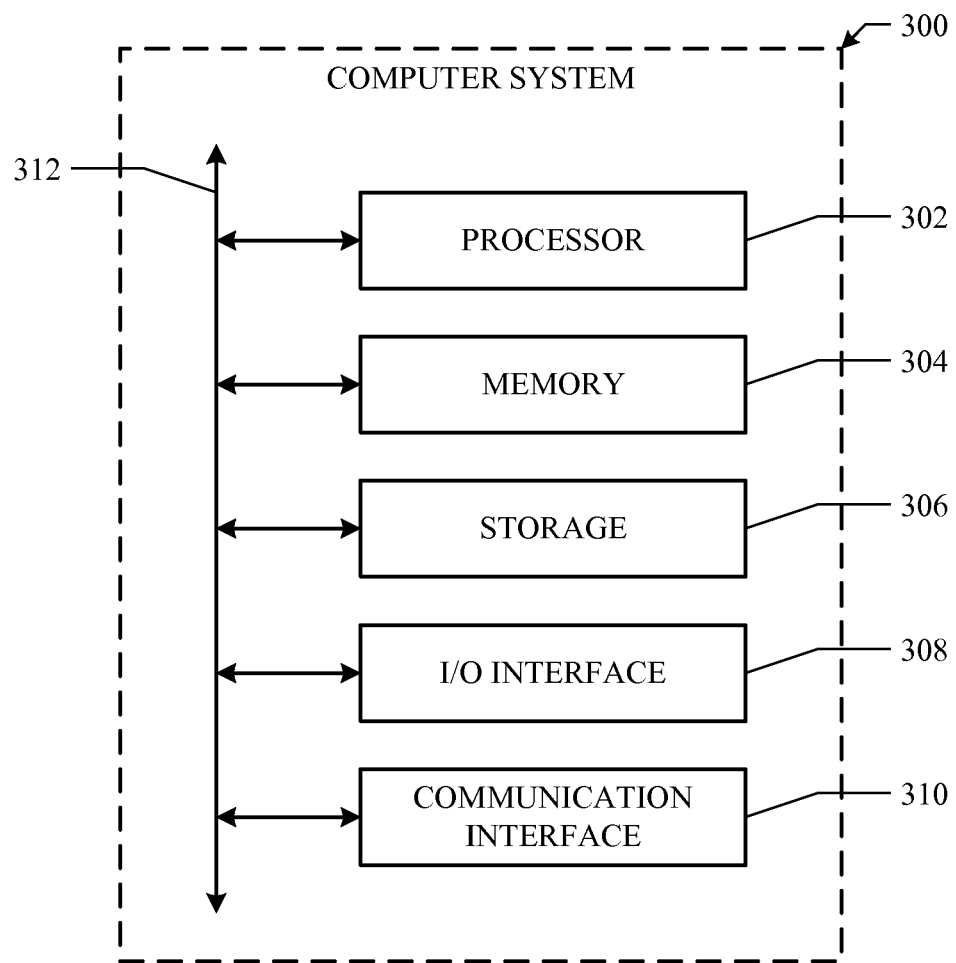
FIG. 3 illustrates an example computer system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
  receiving a request from a client computing device to access an electronic graphical user interface (GUI) associated with a particular QR code scanned by the client computing device, wherein:
    the particular QR code is associated with at least a default GUI and a secure GUI corresponding to the particular QR code;
    the particular QR code, the default GUI associated with the particular QR code, and the secure GUI associated with the particular QR code are associated with a particular zone; and
    the secure GUI comprises a set of tasks corresponding to the particular zone and an interactive region for updating a status of one or more of the set of tasks corresponding to the particular zone;
determining whether a user associated with the requesting client computing device is authenticated to access the secure GUI corresponding to the particular QR code by determining that the user associated with the requesting client computing device has a valid user-specific authentication associated with the identity of the user; and
in response to a determination that the user associated with the requesting client computing device is authenticated to access the secure GUI corresponding to the particular QR code, then:
selecting the secure GUI corresponding to the particular QR code for presentation by the requesting client computing device; and
associating the identity of the user with one or more updates of the status of one or more of the set of tasks corresponding to the particular zone; or
in response to a determination that the user associated with the requesting client computing device is not authenticated to access the secure GUI corresponding to the particular QR code, selecting the default GUI corresponding to the particular QR code for presentation by the requesting client computing device.

2. The method of claim 1, wherein the particular zone includes the physical place in which the QR code is placed.

3. The method of claim 1, wherein the default GUI comprises an interactive region for inputting feedback corresponding to the particular zone associated with the particular QR code.

4. The method of claim 1, where at least some of the secure GUI selected for presentation by the client computing device is determined based on the identity of the user.

5. The method of claim 1, further comprising providing, prior to determining whether a user associated with the requesting client computing device is authenticated to access the secure GUI corresponding to the particular QR code, the default GUI for presentation by the requesting client computing device, wherein the default GUI includes an interactive element for authenticating a user to access the secure GUI corresponding to the particular QR code.

6. The method of claim 1, further comprising determining that the requesting client computing device is authenticated to access the secure GUI corresponding to the particular QR code based on authentication credentials associated with a place at which the QR code is physically located.

7. The method of claim 1, further comprising determining that the requesting client computing device is authenticated to access the secure GUI corresponding to the particular QR code based on authentication credentials associated with the identity of the user of the client computing device.

8. The method of claim 1, further comprising determining that the requesting client computing device is authenticated to access the secure GUI corresponding to the particular QR code based on authentication credentials associated with a particular entity, wherein the authentication credentials associated with the particular entity are valid for a plurality of QR codes that are each associated with a different place.

9. The method of claim 1, wherein the client computing device comprises a smartphone.

10. One or more computer-readable non-transitory storage media embodying software that is operable when executed to:
access a request from a client computing device to access an electronic graphical user interface (GUI) associated with a particular QR code scanned by the client computing device, wherein:
the particular QR code is associated with at least a default GUI and a secure GUI corresponding to the particular QR code;
the particular QR code, the default GUI associated with the particular QR code, and the secure GUI associated with the particular QR code are associated with a particular zone; and
the secure GUI comprises a set of tasks corresponding to the particular zone and an interactive region for updating a status of one or more of the set of tasks corresponding to the particular zone;
determine whether a user associated with the requesting client computing device is authenticated to access the secure GUI corresponding to the particular QR code by determining that the user associated with the requesting client computing device has a valid user-specific authentication associated with the identity of the user; and
in response to a determination that the user associated with the requesting client computing device is authenticated to access the secure GUI corresponding to the particular QR code, then:
select the secure GUI corresponding to the particular QR code for presentation by the requesting client computing device; and
associate the identity of the user with one or more updates of the status of one or more of the set of tasks corresponding to the particular zone; or
in response to a determination that the user associated with the requesting client computing device is not authenticated to access the secure GUI corresponding to the particular QR code, select the default GUI corresponding to the particular QR code for presentation by the requesting client computing device.

11. The media of claim 10, wherein the software is further operable when executed to provide, prior to determining whether a user associated with the requesting client computing device is authenticated to access the secure GUI corresponding to the particular QR code, the default GUI for presentation by the requesting client computing device, wherein the default GUI includes an interactive element for authenticating a user to access the secure GUI corresponding to the particular QR code.

12. The media of claim 10, wherein the client computing device comprises a smartphone.

13. A system comprising:
one or more processors; and
a memory coupled to the one or more processors embodying software, the one or more processors operable to execute the software to:
access a request from a client computing device to access an electronic graphical user interface (GUI) associated with a particular QR code scanned by the client computing device, wherein:
the particular QR code is associated with at least a default GUI and a secure GUI corresponding to the particular QR code;
the particular QR code, the default GUI associated with the particular QR code, and the secure GUI associated with the particular QR code are associated with a particular zone; and
the secure GUI comprises a set of tasks corresponding to the particular zone and an interactive region for updating a status of one or more of the set of tasks corresponding to the particular zone;

determine whether a user associated with the requesting client computing device is authenticated to access the secure GUI corresponding to the particular QR code by determining that the user associated with the requesting client computing device has a valid user-specific authentication associated with the identity of the user; and in response to a determination that the user associated with the requesting client computing device is authenticated to access the secure GUI corresponding to the particular QR code, then:
select the secure GUI corresponding to the particular QR code for presentation by the requesting client computing device; and
associate the identity of the user with one or more updates of the status of one or more of the set of tasks corresponding to the particular zone; or in response to a determination that the user associated with the requesting client computing device is not authenticated to access the secure GUI corresponding to the particular QR code, select the default GUI corresponding to the particular QR code for presentation by the requesting client computing device.

14. The system of claim 13, wherein the one or more processors are further operable to execute the software to provide, prior to determining whether a user associated with the requesting client computing device is authenticated to access the secure GUI corresponding to the particular QR code, the default GUI for presentation by the requesting client computing device, wherein the default GUI includes an interactive element for authenticating a user to access the secure GUI corresponding to the particular QR code.

15. The system of claim 13, wherein the client computing device comprises a smartphone.

16. The media of claim 10, wherein the particular zone includes the physical place in which the QR code is placed.

17. The media of claim 10, wherein the default GUI comprises an interactive region for inputting feedback corresponding to the particular zone associated with the particular QR code.

18. The media of claim 10, where at least some of the secure GUI selected for presentation by the client computing device is determined based on the identity of the user.

19. The media of claim 10, wherein the software is further operable when executed to determine that the requesting client computing device is authenticated to access the secure GUI corresponding to the particular QR code based on authentication credentials associated with a place at which the QR code is physically located.

20. The media of claim 10, wherein the software is further operable when executed to determine that the requesting client computing device is authenticated to access the secure GUI corresponding to the particular QR code based on authentication credentials associated with the identity of the user of the client computing device.

21. The media of claim 10, wherein the software is further operable when executed to determine that the requesting client computing device is authenticated to access the secure GUI corresponding to the particular QR code based on authentication credentials associated with a particular entity, wherein the authentication credentials associated with the particular entity are valid for a plurality of QR codes that are each associated with a different place.

22. The system of claim 13, wherein the particular zone includes the physical place in which the QR code is placed.

23. The system of claim 13, wherein the default GUI comprises an interactive region for inputting feedback corresponding to the particular zone associated with the particular QR code.

24. The system of claim 13, where at least some of the secure GUI selected for presentation by the client computing device is determined based on the identity of the user.

25. The system of claim 13, wherein the one or more processors are further operable to execute the software to determine that the requesting client computing device is authenticated to access the secure GUI corresponding to the particular QR code based on authentication credentials associated with a place at which the QR code is physically located.

26. The system of claim 13, wherein the one or more processors are further operable to execute the software to determine that the requesting client computing device is authenticated to access the secure GUI corresponding to the particular QR code based on authentication credentials associated with the identity of the user of the client computing device.

27. The system of claim 13, wherein the one or more processors are further operable to execute the software to determine that the requesting client computing device is authenticated to access the secure GUI corresponding to the particular QR code based on authentication credentials associated with a particular entity, wherein the authentication credentials associated with the particular entity are valid for a plurality of QR codes that are each associated with a different place.

* * * * *